US007526423B2

(12) United States Patent
Suzuki

(10) Patent No.: US 7,526,423 B2
(45) Date of Patent: *Apr. 28, 2009

(54) APPARATUS AND METHOD FOR SELECTING A TRANSLATION WORD OF AN ORIGINAL WORD BY USING A TARGET LANGUAGE DOCUMENT DATABASE

(75) Inventor: Hirokazu Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/905,780

(22) Filed: Oct. 4, 2007

(65) Prior Publication Data

US 2008/0040098 A1   Feb. 14, 2008

Related U.S. Application Data

(63) Continuation of application No. 10/639,440, filed on Aug. 13, 2003, now Pat. No. 7,295,964.

(30) Foreign Application Priority Data

Aug. 22, 2002   (JP)   ............................ P2002-242368

(51) Int. Cl.
  *G06F 17/28* (2006.01)
(52) U.S. Cl. ........................................................ 704/2
(58) Field of Classification Search ...................... 704/2
  See application file for complete search history.

(56) References Cited

U.S. PATENT DOCUMENTS

| 5,396,419 | A | * | 3/1995 | Morimoto ...................... 704/2 |
| 5,625,553 | A | * | 4/1997 | Kutsumi et al. ................ 704/2 |
| 5,646,840 | A | | 7/1997 | Yamauchi et al. |
| 5,652,896 | A | | 7/1997 | Yamauchi et al. |
| 5,675,815 | A | | 10/1997 | Yamauchi et al. |
| 5,845,143 | A | | 12/1998 | Yamauchi et al. |

FOREIGN PATENT DOCUMENTS

JP        6-251055        9/1994

(Continued)

OTHER PUBLICATIONS

Notification of Reasons for Refusal issued by the Japanese Patent Office on Mar. 14, 2006, for Japanese Patent Application No. 2002-242368, and English-language translation thereof.

(Continued)

*Primary Examiner*—Susan McFadden
(74) *Attorney, Agent, or Firm*—Finnegan, Henderson, Farabow, Garrett & Dunner, L.L.P.

(57) ABSTRACT

A machine translation apparatus includes a plurality of target language document databases used for a translation from an original language to a target language. A database control unit assigns a priority degree to each of the plurality of target language document databases, and indicates a target language document database of the highest priority degree. A translation word generation unit generates a plurality of translation word candidates of an original word for the translation. A translation word learning unit selects a translation word from the plurality of translation word candidates by using the target language document database indicated by the database control unit.

19 Claims, 17 Drawing Sheets

FOREIGN PATENT DOCUMENTS

| | | |
|---|---|---|
| JP | 8-101836 | 4/1996 |
| JP | 9-81572 | 3/1997 |
| JP | 2000-250914 | 9/2000 |

OTHER PUBLICATIONS

Suzuki et al., "Translation Word Learning Method Using a Single Language Corpus of a Target Language," Proceedings of the 8th Annual Meeting of the Association for Computational Linguistics, vol. 16 (2002), 4 pages.

Pantel et al., AI2001, "A Statistical Corpus-Based Term Extractor," Lecture Notes in Artificial Intelligence (2001), pp. 36-46.

Dagan et al., "Word Sense Disambiguation Using a Second Language monolingual Corpus," Association for Computational Linguistics (1994), pp. 563-596.

\* cited by examiner

| DATABASE NAME | PRIORITY DEGREE | NON-APPLIED WORD OF TRANSLATION WORD'S SELECTION | ORIGINAL SENTENCE DATA |
|---|---|---|---|
| DATABASE A | 3 | W1, W2, W3 | DOCUMENT 1<br>DOCUMENT 2 |
| DATABASE B | 2 | W2, W4 | DOCUMENT 3 |
| DATABASE C | 1 | W5 | DOCUMENT 4<br>DOCUMENT 5<br>DOCUMENT 6 |
| . . . | . . . | . . . | . . . |

FIG.7

APPARATUS AND METHOD FOR SELECTING A TRANSLATION WORD OF AN ORIGINAL WORD BY USING A TARGET LANGUAGE DOCUMENT DATABASE

This is a continuation of application Ser. No. 10/639,440, filed Aug. 13, 2003 now U.S. Pat. No. 7,295,964, which is incorporated herein by reference.

CROSS-REFERENCE TO RELATED APPLICATIONS

This application is based upon and claims the benefit of priority from the prior Japanese Patent Application P2002-242368, filed on Aug. 22, 2002; the entire contents of which are incorporated herein by reference.

FIELD OF THE INVENTION

The present invention relates to a machine translation apparatus and method for automatically executing translation word learning.

BACKGROUND OF THE INVENTION

Recently, a machine translation system exists for automatically translating a sentence of a first language (original language) to a sentence of a second language (target language). In a translation processing of the machine translation system, first, an input original sentence is divided into a predetermined processing unit such as a word (a phrase) by morphological analysis or sentence structure analysis. Next, an applicable translation rule and a corresponding translation word (translation phrase) are determined for each processing unit by retrieving a translation dictionary. Then, each translation word is combined by a predetermined rule to generate a translation sentence. In this way, the translation sentence corresponding to the input original sentence is obtained.

In order to realize a high accuracy translation in this machine translation, use of a dictionary suitable for the translation is important. In order to cope with translation of various original sentences, the dictionary generally has a plurality of translation word candidates for each original word of the same language. Accordingly, a user must select one translation word suitable for the user's intention (a liking, an area or a purpose) from the plurality of translation word candidates.

If the user's selection operation is learned by the machine translation system, hereafter, the translation words selection can be suitable for the user's intention. In the case that a translation word unsuitable for the user's intention is generated, a learning operation of translation word is executed. As the learning operation, the user selects his/her suitable translation word from other translation candidates again, and indicates the selected translation word to the system. By executing the learning operation, hereafter, this translation word is preferentially selected.

In this way, a function to select a translation word suitable for the user's intention by the learning operation is called "translation word learning". For example, "Konpyuta" "Konpyutah" "Keisanki" exist as translation word candidates (Japanese) for "computer" (English). One translation word to be selected from these translation word candidates is determined based on the user's liking, the field, and the use purpose.

In a machine translation system of the prior art, the translation word learning is realized by the user's learning operation. Concretely, in the case that a plurality of translation word candidates for the same original word exist, the plurality of translation word candidates are presented to the user, and the user selects one translation word from the plurality of translation word candidates. In response to the user's selection, this translation word corresponding to the original word is stored in the system. Hereafter, in the case of translating the original word, the system preferentially selects the stored translation word. This translation word learning is described in Japanese Patent Disclosure (Kokai) PH9-81572 "Translation device and dictionary priority setting method" and Japanese Patent Disclosure (Kokai) PH8-101836 "Learning method for machine translation". In this method, if a large number of unsuitable translation words is first selected by the system, the number of times of the user's learning operation is also large. As a result, a large burden is laid on the user.

Accordingly, as a translation word learning method unnecessary for the user's troublesome operation, the translation word is automatically determined by statistic information of a target language document such as a corpus. In this translation word learning method, the user previously prepares the target language document suitable for the user's intention, and the translation word learning suitable for the user's intention can be automatically executed. Concretely, appearance frequency of each word in the target language document is previously counted, and each word with the appearance frequency is stored in a table. In the case that a plurality of translation word candidates is generated for the same original word, one candidate of the highest appearance frequency in the plurality of translation word candidates is selected by referring to the table. This method is described in "Translation word learning method using a single language corpus of a target language" (Proceedings of the 8th Annual Meeting of the Association for Computational linguistics, 2002 Vol. 1, pp 276-280) and Japanese Patent Disclosure (Kokai) P2000-250914 "Machine translation method and device and recording medium recording machine translation program".

However, as mentioned-above, in this automatic translation word learning method, a translation word is determined by using one document of the target language. Accordingly, an unsuitable translation word for some original word is often selected. In this case, if the translation word learning is executed by using another document of the target language, a suitable translation word for this original word may be selected. However, even if a plurality of target language documents is previously prepared, it is difficult for the user to select one target language document by which a suitable translation word is determined. For example, in the case that the user prepares a plurality of target language documents each of which contents are similar, if the user does not sufficiently understand the contents of each target language documents, he/she cannot select one useful target language document.

Briefly, in the case that a plurality of target language documents is prepared, even if the user indicates one target language document suitable for his/her intention, it sometimes happens that an unsuitable translation word is automatically output by using the indicated target language document. Accordingly, a method to usually select only suitable translation words by using the target language document is desired.

SUMMARY OF THE INVENTION

The present invention is directing to a machine translation apparatus and a method for usually selecting the translation word suitable for the user's intention by using the target language document.

According to an aspect of the present invention, there is provided a machine translation apparatus including a plurality of target language document databases used for a translation from an original language to a target language, comprising: a database control unit configured to assign a priority degree to each of the plurality of target language document databases, and to indicate a target language document database of the highest priority degree; a translation word generation unit configured to generate a plurality of translation word candidates of an original word for the translation; and a translation word learning unit configured to select a translation word from the plurality of translation word candidates by using the target language document database indicated by said database control unit.

According to other aspect of the present invention, there is also provided a method in a system including a plurality of target language document databases used for a translation from an original language to a target language, comprising: assigning a priority degree to each of the plurality of target language document databases; indicating a target language document database of the highest priority degree; generating a plurality of translation word candidates of an original word for the translation; and selecting a translation word from the plurality of translation word candidates by using the indicated target language document database.

According to still other aspect of the present invention, there is also provided a computer program product, comprising: a computer readable program code embodied in said product for causing a computer to translate an original language to a target language by using a plurality of target language document databases, said computer readable program code comprising: a first program code to assign a priority degree to each of the plurality of target language document databases; a second program code to indicate a target language document database of the highest priority degree; a third program code to generate a plurality of translation word candidates of an original word for the translation; and a fourth program code to select translation word from the plurality of translation word candidates by using the indicated target language document database.

BRIEF DESCRIPTION OF THE DRAWINGS

FIG. 7 is a schematic diagram of one example of data stored in control database memory 63 and 64 in FIG. 6.

DETAILED DESCRIPTION OF THE EMBODIMENTS

Figure 1:
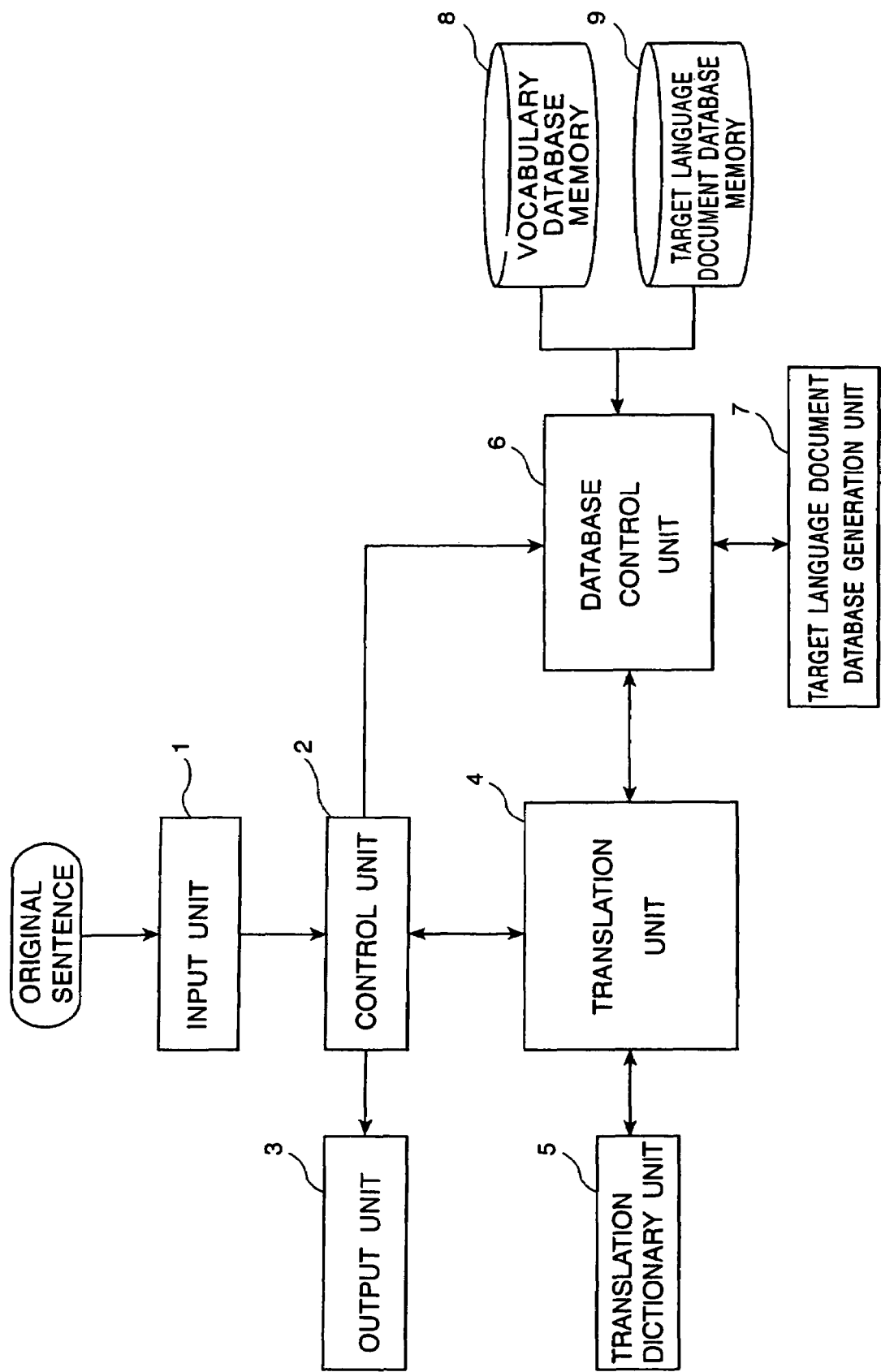
FIG. 1 is a block diagram of an exemplary machine translation system according to an embodiment of the present invention.

Hereinafter, various embodiments of the present invention will be explained by referring to the drawings.

FIG. 1 is a block diagram of an exemplary machine translation system according to one embodiment of the present invention. In an embodiment of the present invention, in the case of translation from an original language to a target language, a user can compose a plurality of target language document databases in order to improve the accuracy of translation word learning. Furthermore, the user can identify or set one or more non-applied word of translation word's selection for each target language document database. In the system, a priority degree of each target language document database is determined based on a number of the non-applied word of translation word's selection. As a result, translation processing with a high accuracy is executed by using the target language document database having the highest priority degree. Furthermore, original sentence data from which the translation word was selected by using the target language document database is stored with the target language document database. In the case of translation word learning for an input original sentence, a target language document database of which the original sentence data is similar to the input original sentence is selected for use of translation word learning. As a result, translation processing of higher accuracy can be realized. Last, presentation to support a selection of the target language document database is executed for the user. Accordingly, the user's operation of translation word learning can be greatly improved.

As for the non-applied word of translation word's selection, selection of a translation word may be streamlined. In this case, the translation word (default translation word) selected before the translation word learning is automatically determined as the translation word candidate. This idea that original words (original language) unnecessary for translation word learning are registered for each target language document database. Such words are applied to a vocabulary database used for translation. Briefly, original words not to be translated using a vocabulary database are set or indicated in the vocabulary database. In this case, an unsuitable translation word selected using the vocabulary database is suppressed. Hereafter, original words unnecessary for translation word learning and original words unnecessary for translation using the vocabulary database are called a "non-applied word of translation word's selection".

As used herein, those skilled in the art will understand that the term "unit" is broadly defined as a processing device (such as a computer, a microprocessor, a microcontroller, a specifically programmed logic circuit, an application specific integrated circuit, a discrete circuit, etc.) that provides the described communication and functionally desired. While such a hardware-based implementation is clearly described and contemplated, those skilled in the art will quickly recognize that a "unit" may alternatively be implemented as a software module that works in combination with such a processing device.

Depending on the implementation constraints, such a software module or processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

In FIG. 1, an input unit 1 inputs electronic data (Hereafter, it is called a document) of a document (original sentence) as a translation object, and outputs the document to a control unit 2. For example, the input unit 1 may be composed by a keyboard, or a mouse. Input of the document based on the user's input operation is possible by the input unit 1. Furthermore, as the input unit 1, a read-out apparatus from a computer-readable medium such as an OCR (Optical character reader), a floppy disk, a magnetic tape, a magnetic disk or an optical disk, can be adopted in another example. The input unit 1 can supply the document read from the read-out apparatus to the control unit 2. Furthermore, the input unit 1 can supply input of various commands to the control unit 2.

An output unit 3 outputs a translation result supplied through the control unit 2. The output unit 3 can output the translation result on a screen of a display apparatus (not shown in FIG. 1) by the control unit 2. Furthermore, the output unit 3 can output the translation result by speech, and can display a response from the control unit 2 for various kinds of instructions. As the output unit 3, the display apparatus such as various kinds of displays, a printer, an output apparatus to a computer-readable medium such as a floppy disk, a magnetic tape, a magnetic disk and an optical disk, and a sending apparatus to send the document to another media, can be adopted.

In response to an indication from the control unit 2, a translation unit 4 translates the input original sentence from the input unit 1 by using a translation dictionary unit 5 and a vocabulary database memory 8, and outputs the translation result to the control unit 2.

The translation dictionary unit 5 stores a vocabulary dictionary and various rules necessary for translation. For example, the translation dictionary unit 5 stores a morphological analysis rule, a construction•semantic analysis rule, a conversion rule of translation, and a translation sentence generation rule. The vocabulary database memory 8 stores a word•phrase dictionary.

Figure 2:
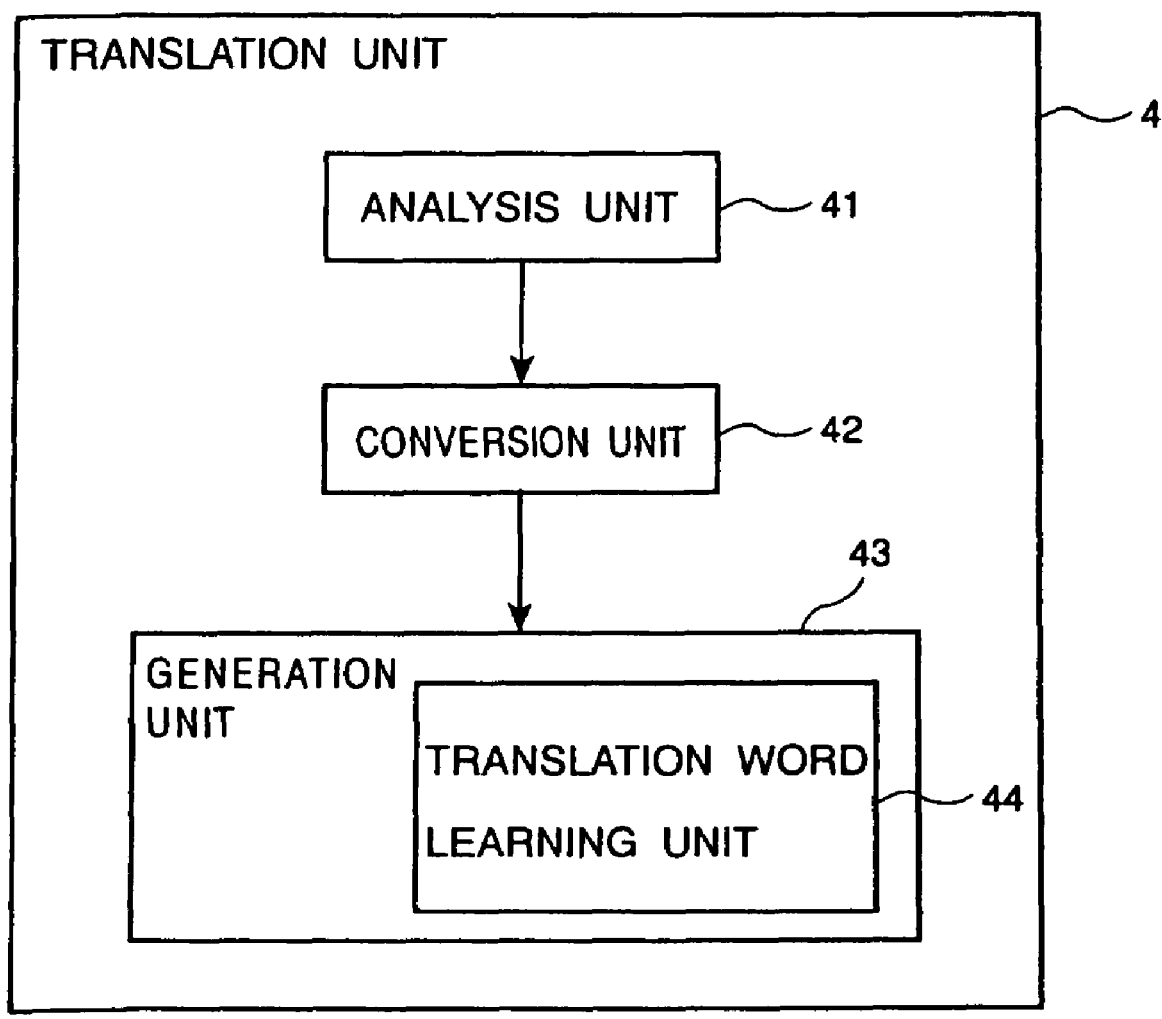
FIG. 2 is a block diagram of a translation unit 4 in FIG. 1.

FIG. 2 is a block diagram of concrete component of the translation unit 4 in FIG. 1. The translation unit 4 is comprised of an analysis unit 41, a conversion unit 42 and a generation unit 43. The analysis unit 41 executes a morphological analysis and provides a consulting dictionary for the input original sentence by using the morphological analysis rule stored in the translation dictionary unit 5 and the word•phrase dictionary stored in the vocabulary database memory 8. After obtaining information (a part of speech, an inflection, a translation word) necessary for translation processing, the analysis unit 4 executes construction•semantic analysis processing by using the construction•semantic analysis rule stored in the translation dictionary unit 5. The conversion unit 42 converts a result of the construction semantic analysis to a structure of the target language by using the conversion rule stored in the translation dictionary unit 5. The generation unit 43 receives output from the conversion unit 42, generates a sentence of the target language by using the translation sentence generation rule stored in the translation dictionary unit 5, and outputs the translation result to the control unit 2.

The generation unit 43 includes a translation word learning unit 44. If the control unit 2 indicates translation word learning, the translation word learning unit 44 executes a translation word learning. If the control unit 2 does not indicate the translation word learning or indicates non-translation word learning, the translation word learning unit 44 does not execute the translation word learning. In the case of executing the translation word learning, if a plurality of translation word candidates exist for the same word in the original language, the translation word learning unit 44 may select a suitable translation word from the plurality of translation word candidates by using statistic data and list of compound words stored in the target language document database 9.

Figure 3:
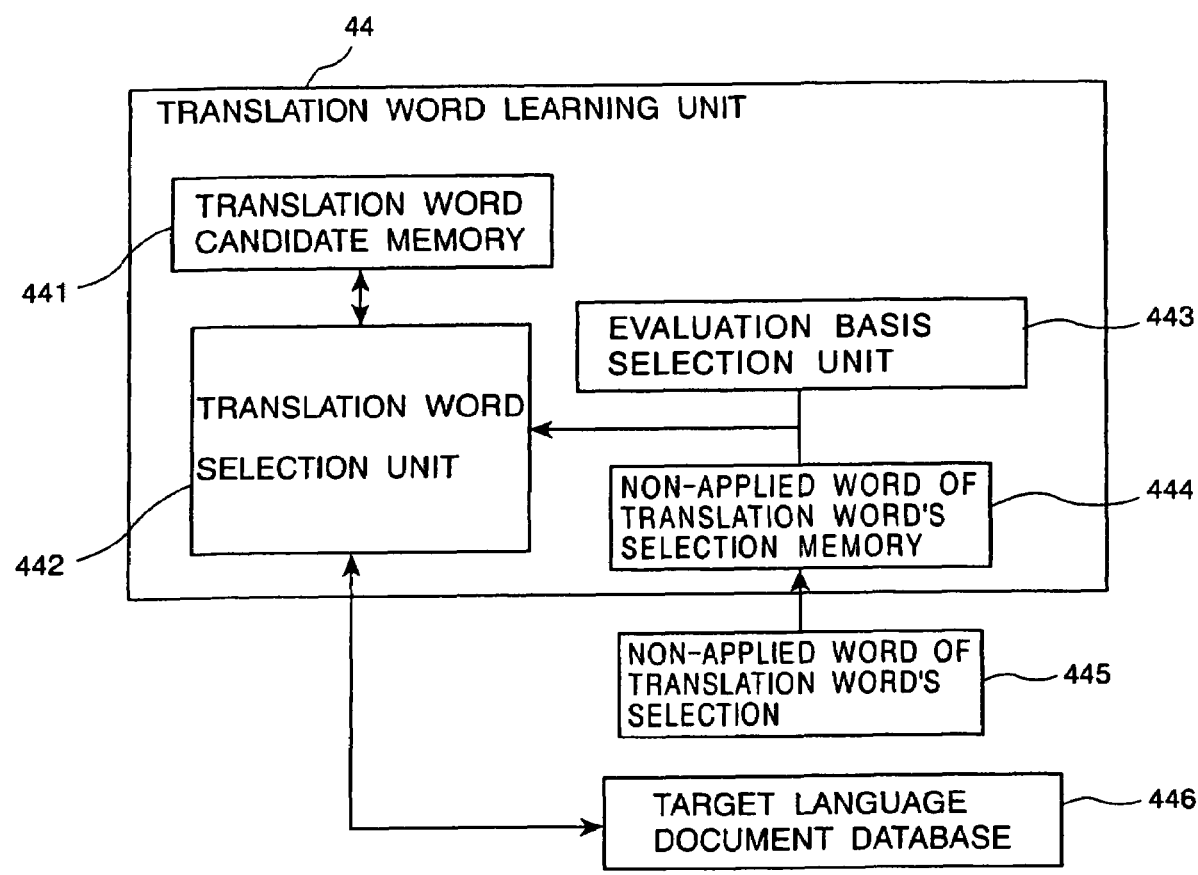
FIG. 3 is a block diagram of a translation word learning unit 44 in FIG. 2.

FIG. 3 is a block diagram of concrete component of the translation word learning unit 44 in FIG. 2. In the translation word learning unit 44, a translation word candidate memory 441 stores all of the translation word candidates for each word of the original language. An evaluation basis selection unit 443 determines an evaluation basis of the translation word selection. A non-applied word of translation word's selection memory 444 temporarily stores the non-applied word of translation word's selection 445. As for the original word (except for the non-applied word of translation word's selection), a translation word selection unit 442 selects a suitable translation word from the plurality of translation word candidates stored in the translation word candidate memory 441 by using the evaluation basis selected by the evaluation basis selection unit 443 and a target language document database 446. As for the non-applied word of translation word's selection, the translation word selection unit 442 may automatically determine the translation word candidate (default translation word) without the user's selection operation.

The translation word learning unit 44 has not only an automatic function of translation word learning using the target language document database but also another function of translation word learning. For example, if the user indicates a suitable translation word, hereafter, this translation word is preferentially selected for the same original word. Furthermore, a suitable translation word is automatically determined by estimating an area of the document as translation object. In these cases, component elements necessary for realizing each translation word learning function are prepared in the translation word learning unit 44.

Based on the user's indication of database and information (priority degree and so on) of each database, a database control unit 6 selects the target language document database 446 used for translation word learning from the target language document database memory 9, and sends a name of the target language document database to the translation word learning unit 44.

A target language document database generation unit 7 can generate a target language document database used for the translation word learning unit 44 from an arbitrary target language document prepared by the user. The database control unit 6 stores the target language document in the target language document database memory 9.

Figure 4:
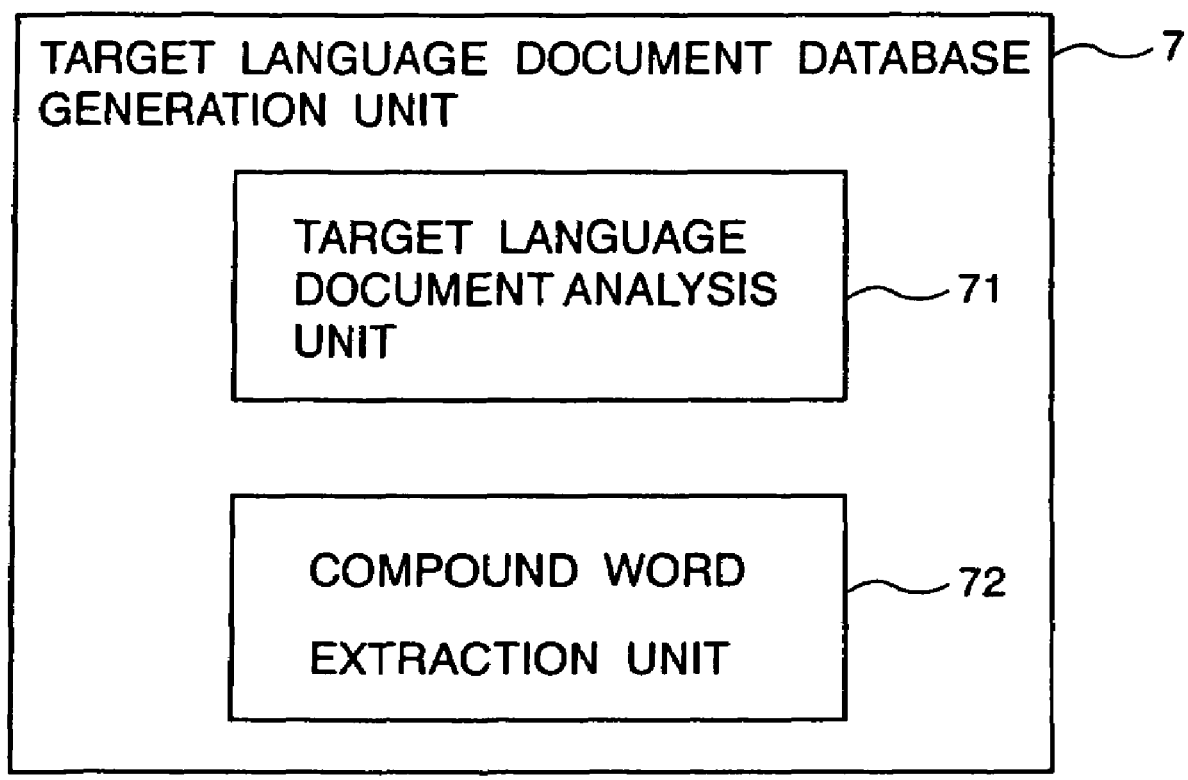
FIG. 4 is a block diagram of a target language document database generation unit in FIG. 1.

FIG. 4 is a block diagram of concrete component of the target language document database generation unit 7 in FIG. 1. A target language document analysis unit 71 morphologically analyzes a target language document prepared by the user, adds information related to the part of speech for words in the document to the target language document, and outputs this analysis result. A compound word extraction unit 72 extracts compound words from the target language document, and outputs the extraction result. The analysis result of the target language document analysis unit 71 and the extraction result of the compound word extraction unit 72 are supplied to the target language document database memory 9 through the database control unit 6.

Figure 5:
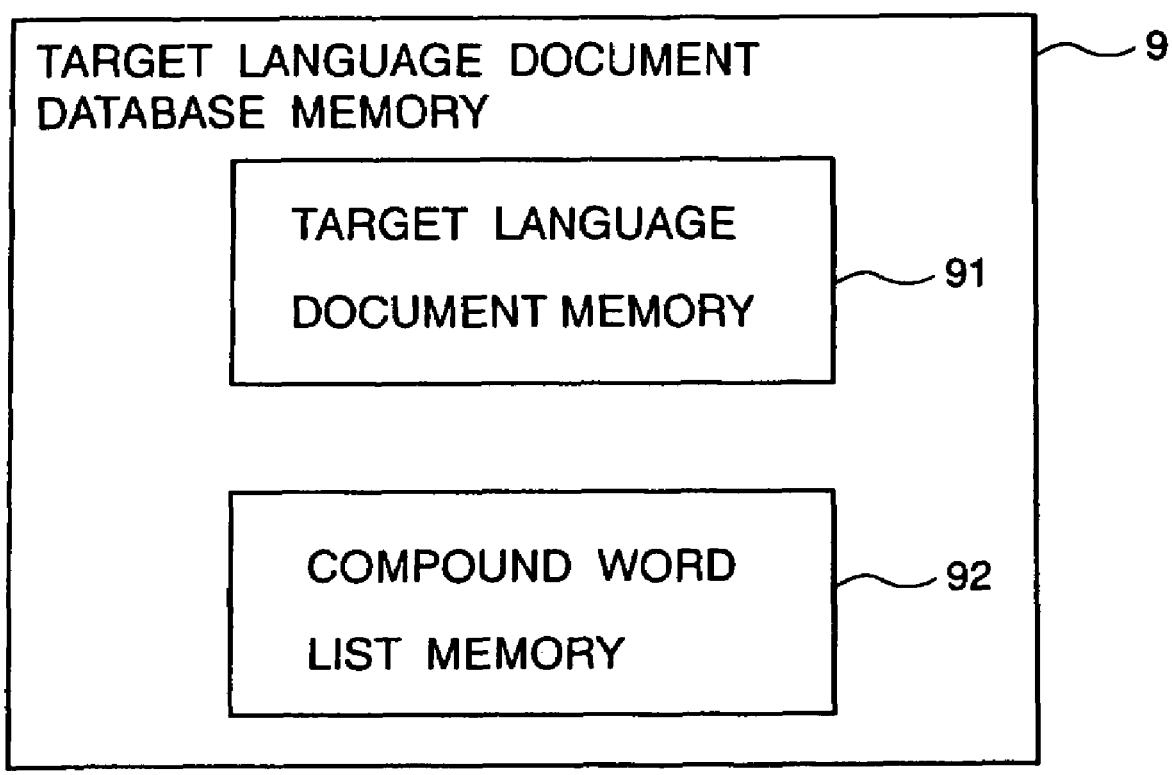
FIG. 5 is a block diagram of a target language document database memory 9 in FIG. 1.

FIG. 5 is a block diagram of concrete component of the target language document database memory 9 in FIG. 1. A target language document memory 91 receives the target language document with the part of speech from the target language document analysis unit 71 through the database control unit 6, and stores this information. A compound word list memory 92 receives a list of the compound words included in the target language document from the compound word extraction unit 72, and stores this information. The target language document database memory 9 is not limited to above-mentioned component, and may store various kinds of information (area of document, meaning•concept information of word) based on actual use situation.

Figure 6:
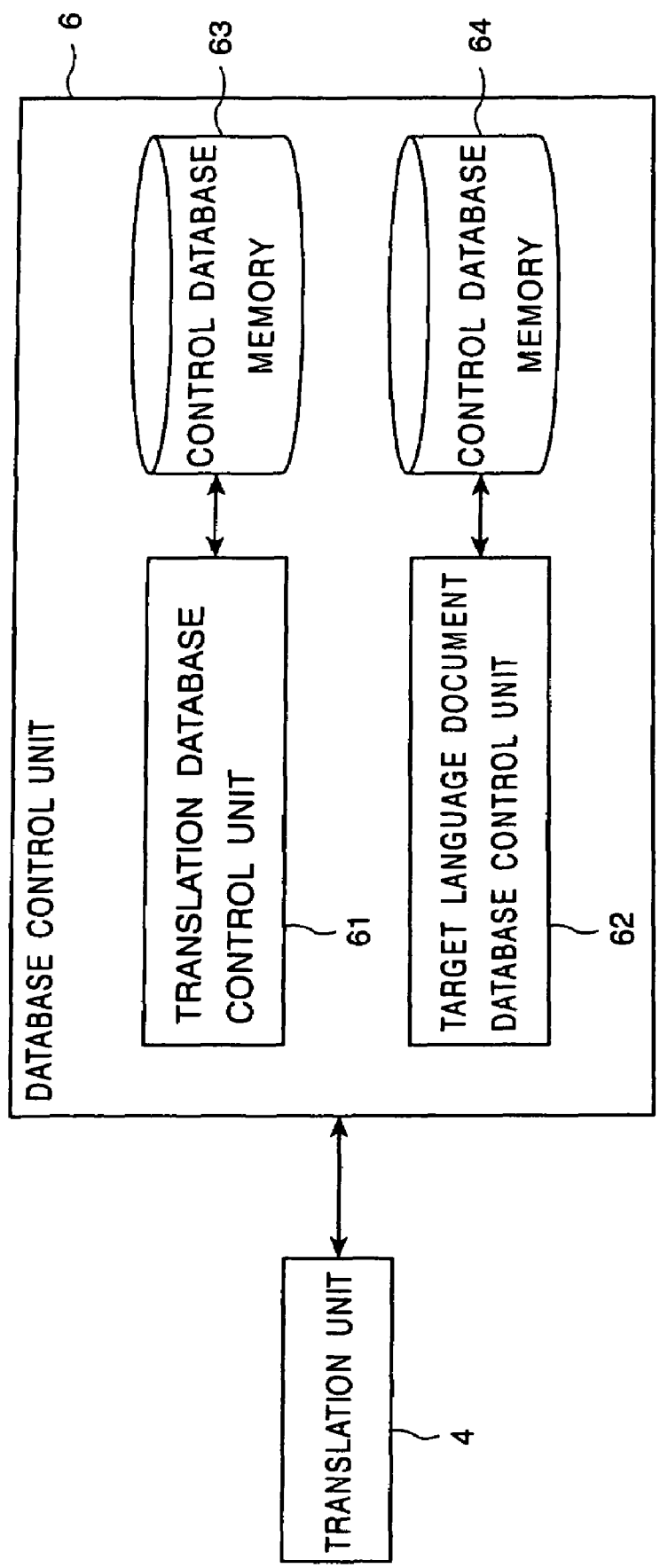
FIG. 6 is a block diagram of a database control unit 6 in FIG. 1.

FIG. 6 is a block diagram of concrete component of the database control unit 6 in FIG. 1. The database control unit 6 controls the non-applied word of translation word's selection, and sends a database name determined based on the non-applied word of translation word's selection and the priority degree to the translation unit 4. A translation database control unit 61 manages a control database memory 63 storing data related to the vocabulary database in the vocabulary database memory 8, and sends an indication of the vocabulary database to be used and the non-applied word of translation word's selection to the translation unit 4. A target language document database control unit 62 manages a control database memory 64 storing data related to the target language document data in the target language document database 9, and sends an indication of the target language document database to be used and the non-applied word of translation word's selection to the translation word learning unit 44 of the translation unit 4. The non-applied word of translation word's selection, the name of database to be used (the target language document database, the vocabulary database), the priority degree of each database, and original sentence data processed by each database up to the present, are stored in the control database memories 63 and 64.

FIG. 7 is a schematic diagram of one example of data format (control database) stored in each of the control database memories 63 and 64 in FIG. 6. The control database stored in the control database memories 63 and 64 respectively includes the priority degree, the non-applied word of translation word's selection and original sentence data in correspondence with each database name. Each database name (A, B, C in FIG. 7) represents a concrete database of either the vocabulary database or the target language document database. For example, when the user first sets the priority degree to each database, the control database is created. Hereafter, whenever a new database is added, whenever a new non-applied word of translation word's selection is set, or whenever a translation processing is executed, each entry of the control database is updated. In this way, the latest use situation of each database is stored in the control database memories 63 and 64.

Next, detail processing of the machine translation system of the present invention is explained by referring to FIGS. 8~17. In an embodiment of the present invention, the target language document database is normally prepared before processing of translation word learning. The target language document database generation unit 7 generates the target language document database from a target language document previously prepared by the user, or a target language document output by the machine translation system. The user can utilize an electronic document stored in a hard disk or obtained through a network as the target language document. In the case that the user utilizes machine translation for business or research, the target language document for the business or the research is often stored in the user's computer. Accordingly, obtaining such a target language document is typically easy. Furthermore, in the case of a general user or a user who does not have a special electronic document, the user can freely obtain various kinds of electronic documents for use as the target language document. Accordingly, it is easy for the user to prepare an electronic document for predetermined subject area. Furthermore, in proportion to the improvement of memory capacity in computers, the user can personally reserve a large quantity of electronic documents. By using the electronic document collected or previously reserved by the user, the target language document specialized for the user is identified or generated. Furthermore, a translation result of an original document can be utilized as the target language document output by the machine translation system. By utilizing the translation result as the target language document again, the target language document database suitable for the user can be composed.

Figure 8:
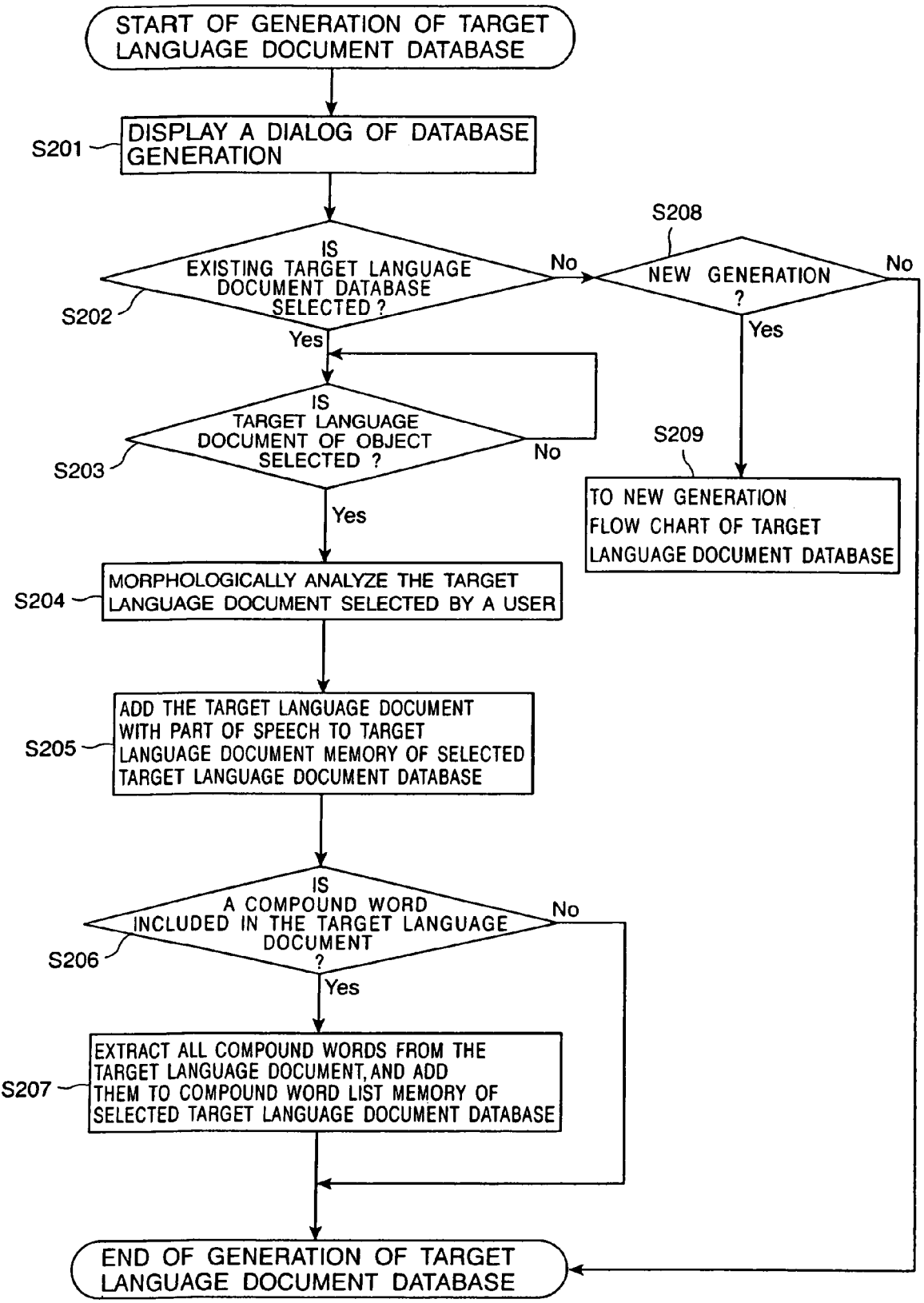
FIG. 8 is a flow chart of addition generation processing of a target language document database according to an embodiment of the present invention.
Figure 9:
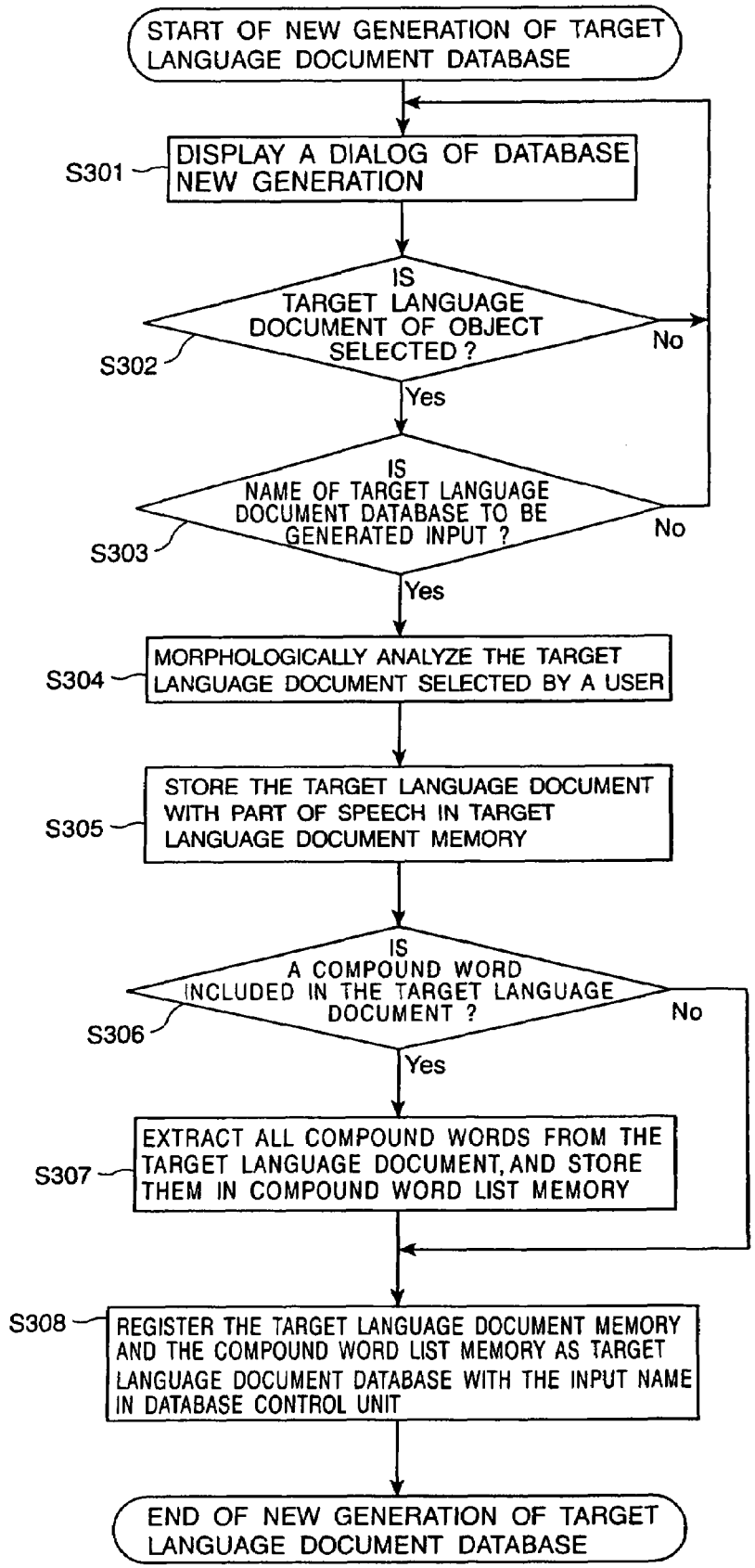
FIG. 9 is a flow chart of new generation processing of a target language document database according to an embodiment of the present invention.
Figure 10:
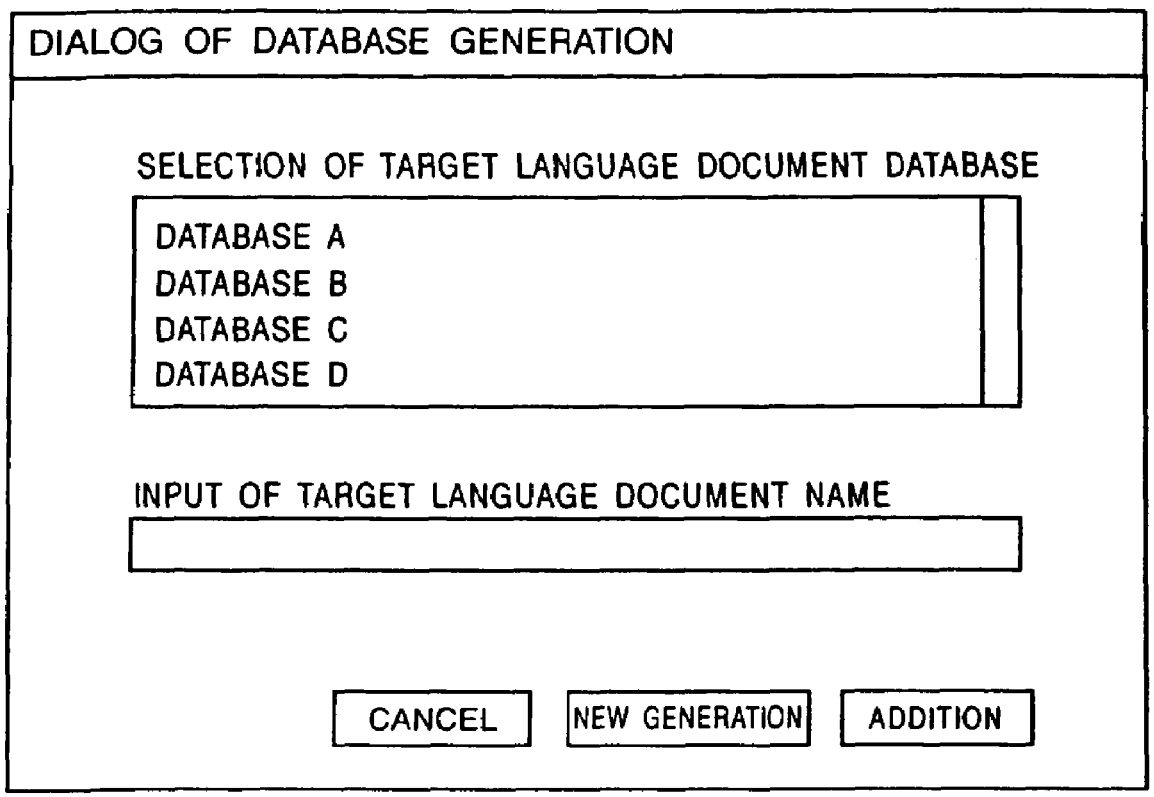
FIG. 10 is a schematic diagram of a display example of a database generation dialog according to an embodiment of the present invention.
Figure 11:
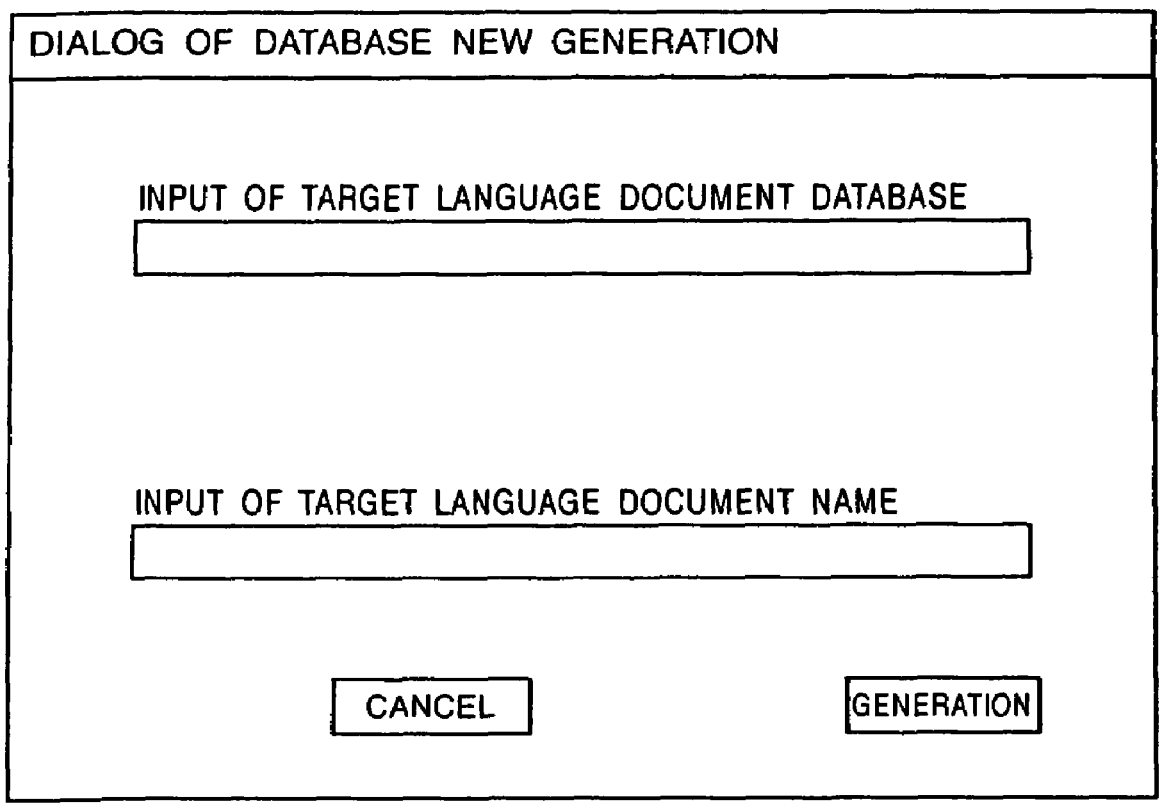
FIG. 11 is a schematic diagram of a display example of a database new generation dialog according to an embodiment of the present invention.

FIG. 8 is a flow chart of generation processing (update) of the target language document database. FIG. 9 is a flow chart of generation processing of new target language document database. FIG. 10 is a schematic diagram of a display example of a database generation dialog which is displayed when the target language document database is generated. FIG. 11 is a schematic diagram of display example of a new database generation dialogue which is displayed when the new target language document database is generated.

First, when the user indicates generation of the target language document database through the input unit 1, the control unit 2 sends an indication to display a dialog of database generation to the output unit 3. In this case, the output unit 3 displays the dialog of database generation as shown in FIG. 10 (S201). In the dialog of database generation of FIG. 10, for example, a column to select a name of the existing target language database and an input column to indicate the target language document prepared by the user are set. Furthermore, a selection button to add data to the existing target language document database and a selection button to newly generate a target language document database are displayed. The control unit 2 receives the user's selection operation. Now, assume that the user indicates new generation of a target language document database by operating the selection button of "new generation" in the dialog of database generation. The control unit 2 moves the processing from S202 to S208 and S209, and executes new generation processing of target language document database. In this case, the control unit 2 displays a dialog of database new generation through the output unit 3 as shown in FIG. 11 (S301). In the dialog of database new generation of FIG. 11, for example, an input column to indicate the target language document database prepared by the user and an input column to indicate a name of the new target language document database are set. By referring to the names of existing target language document databases displayed, the user inputs a name of the new target language document database and inputs (selects) a name of the target language document from which the new target language document database is generated. If the control unit 2 decides that the name of new target language document database is input and the target language document from which the new target language document database is selected at S302 and S303, the control unit 2 morphologically analyzes the selected target language document (S304).

Next, the control unit 2 stores the target language document with the part of speech information (morphological analysis results) in correspondence with the input name of the target language document in the target language document memory 91 (S305). Furthermore, if the control unit 2 decides that a compound word is included in the target language document (S306), the control unit 2 extracts all compound words from the target language document and stores a list having all of the compound words in correspondence with the input name of the target language document in the compound word list memory 92 (S307). Last, the control unit 2 registers stored information of the target language document database memory 9 (the target language document memory 91 and the compound word list memory 92) in the control database memory 64 of the database control unit 6 (S308). In this way, the user can add a prepared target language document to existing target language document database but also generates a new target language document database. Accordingly, the target language document database is composed for each field.

Next, processing of additional data to the existing target language document database is explained. In this case, in the dialog of database generation shown in FIG. 10, the user selects one database to be added from the existing target language document databases, inputs a name of the target language document to be analyzed, and operates the "addition" button. If the control unit 2 decides that the target language document is indicated on the dialog of database generation (S203), the control unit 2 morphologically analyzes the target language document (S204), and adds the part of speech information as the analysis result to the target language document. Then, the control unit 2 adds the target language document with the part of speech information to the selected target language document database, and stores the updated target language document database in the target language document memory 91 (S205). Furthermore, if the control unit 2 decides that a compound word is included in the target language document (S206), the control unit 2 extracts all compound words from the target language document, adds all of the extracted compound words to a list of compound word for the selected target language document database, and stores this updated list in the compound word list memory 92 (S207). In this way, an arbitrary target language document prepared by the user is freely added to the existing, target language document database, and generation of the target language document database suitable for the user is possible. In an embodiment of the present invention, for example, the target language document databases of various subjects (fields) are previously prepared, and translation word selection based on the user's use subject is possible. Furthermore, if the target language document database of the same subject is differently prepared for each use purpose, translation word learning suitable for the use purpose of the user's liking can be executed.

Figure 12:
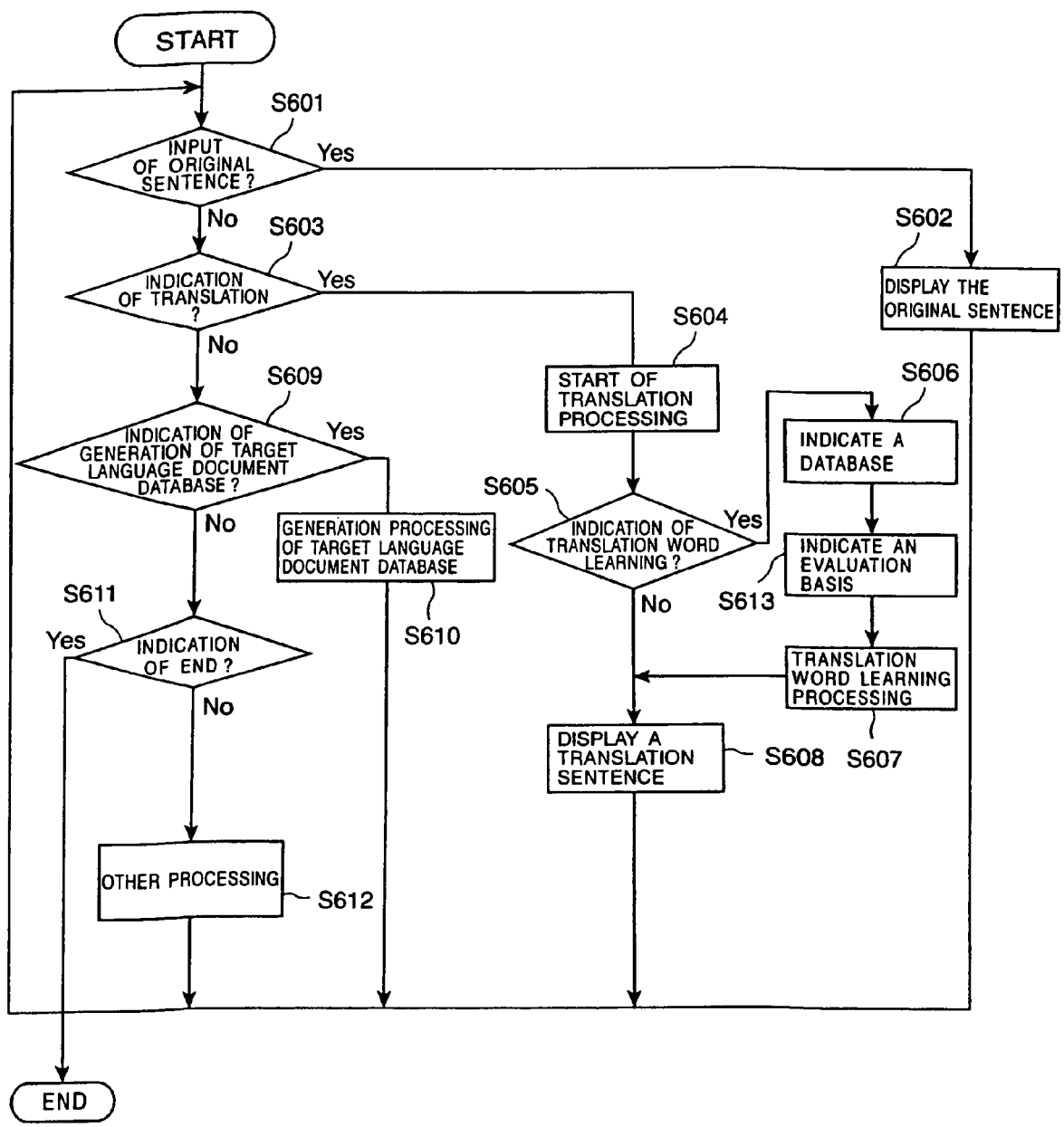
FIG. 12 is a flow chart of interactive processing for the user of a control unit 2 according to an embodiment of the present invention.

FIG. 12 is a flow chart of interactive processing of the control unit 2 for the user according to an embodiment of the present invention. The control unit 2 controls translation processing and translation word learning processing by interactive processing for the user. Concretely, when an original sentence is input through the input unit 1 (S601), the control unit 2 indicates a display of the original sentence (S602). Next, when the user's indication of translation is input through the input unit 1 (S603), the control unit 2 sends an instruction of translation execution and the original sentence data to the translation unit 4 to begin the translation processing (S604). On the other hand, if the user's input operation is not the translation indication, the control unit 2 decides whether the user's input operation is an indication to generate a target language document database (S609). In the case of the indication to generate a target language document database, the control unit 2 sends an instruction of database generation to the target language document database generation unit 7. The target language document database generation unit 7 executes generation processing of the target language document database shown in FIG. 8. (S610). The generated target language document database is stored in the target language document database memory 9. Furthermore, when the user's indication of processing completion is input through the input unit 1 (S611), the control unit 2 finishes the processing. In the case of other input, the control unit 2 executes processing corresponding to the other input (S612). The translation processing of S604 is executed by the translation unit 4. The translation unit 4 executes the translation processing to the target language by using knowledge (such as a morphological analysis rule, a construction•semantic analysis rule, a conversion rule, a generation rule, etc.) stored in the translation dictionary unit 5 and a word•phrase dictionary stored in the vocabulary database memory 8. In this way, the generation unit 43 generates the translation word corresponding to each word of the original sentence. In the case that the indication of translation word learning is not input, the generation unit 43 of the translation unit 4 does not execute translation word learning. In this case, the translation result by the generation unit 43 is returned to the control unit 2. The control unit 2 sends the translation result to the output unit 3 to present to the user (S608).

In generation processing of a translation word by the generation unit 43, assume that the control unit 2 provides an execution instruction of translation word learning (S605) As mentioned-above, in an embodiment of the present invention, a plurality of target language document database each of which is composed from at least one target language document can be generated. By selecting the target language document database suitable for translation by the system or the user, the efficiency of translation word learning is improved. Concretely, if a plurality of target language document databases for translation word learning is stored in the target language document database memory 9, one database may be selected from the plurality of target language document databases and indicated to translation word learning unit 44 (S606). Furthermore, an evaluation basis to be used is indicated to the translation word learning unit 44 (S613). The translation word learning unit 44 executes the translation word learning to select a suitable translation word from a plurality of translation word candidates by using the selected target language document database and the evaluation basis (S607).

In an embodiment of the present invention, in the case of automatic learning of translation word, the target language document database is used in which the user can freely set words considered to be unnecessary for translation word learning. The non-applied word of translation word's selection is controlled by the database control unit 6. Furthermore, the database control unit 6 indicates the target language document database used by the translation word learning unit 44 of the generation unit 43 in the translation unit 4. Briefly, the database control unit 6 controls the non-applied word of translation word's selection, and sends a name of use database determined based on information of the non-applied word of translation word's selection and the priority degree to the translation unit 4.

In one example, assume that a plurality of target language document databases is stored in the target language document database memory 9. Furthermore, as shown in FIG. 7, assume that a name of each target language document database stored in the target language document database memory 9, the priority degree and the non-applied word of translation word's selection, are previously stored in the control database memory 64. In the same way, assume that a plurality of vocabulary databases is stored in the vocabulary database memory 8. Furthermore, as shown in FIG. 7, assume that a name of each vocabulary database stored in the vocabulary database memory 8, the priority degree and the non-applied word of translation word's selection, are previously stored in the control database memory 63.

Figure 13:
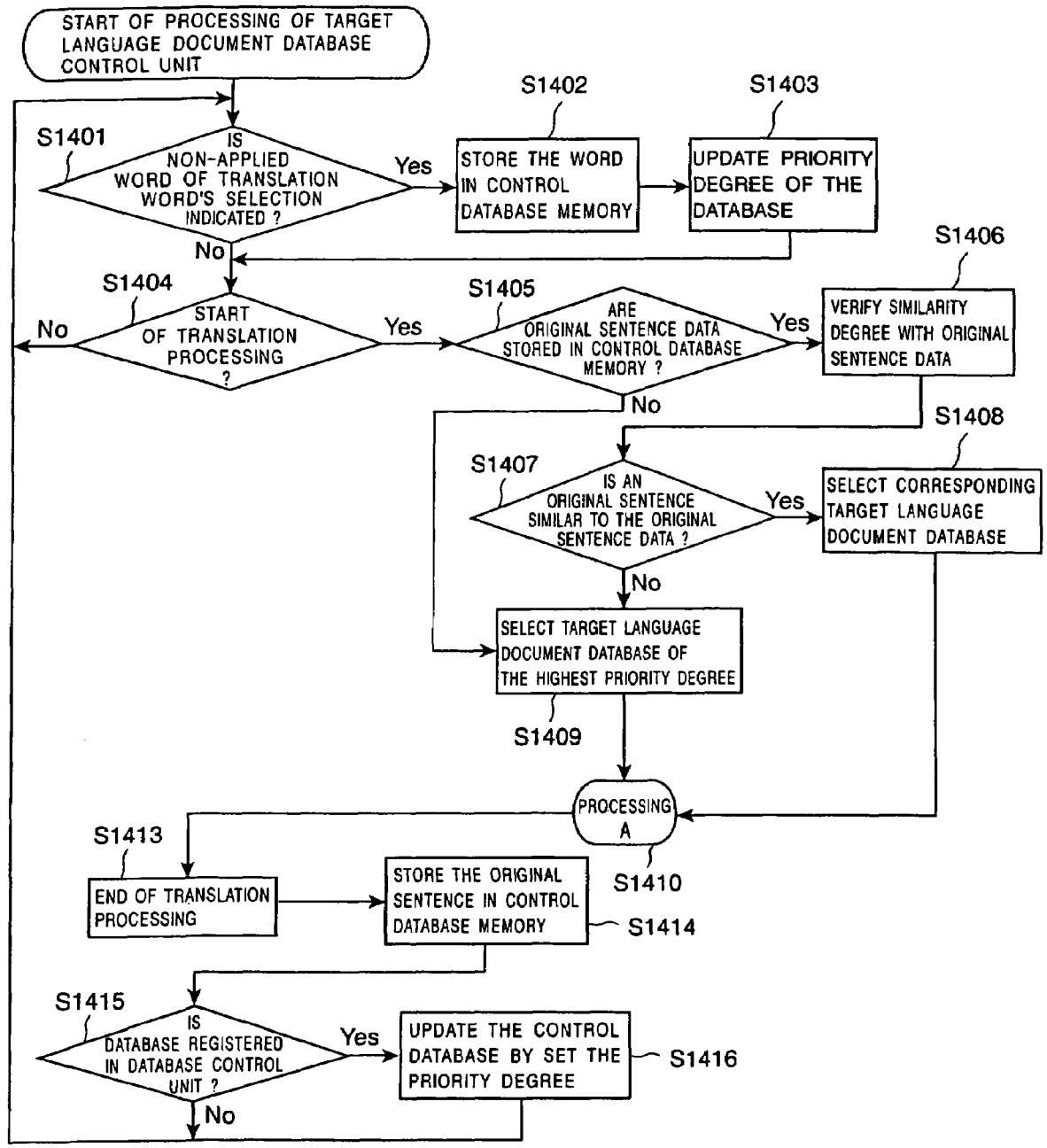
FIG. 13 is a flow chart of processing of a target language document database control unit 62 according to an embodiment of the present invention.

First, processing of translation word learning by using the target language document database is explained by referring to FIG. 13. FIG. 13 is a flow chart of processing of the target language document database control unit 62 in the database control unit 6. In this example, assume that the user operates an indication of non-applied word of translation word's selection to a predetermined word of the original language for the target language document database. In response to this operation, the control unit 2 supplies the indication of the non-applied word of translation word's selection to the target language document database control unit 62 (S1401). The target language document database control unit 62 adds the indicated non-applied word of translation word's selection to the target language document database stored in the control database memory 64 (S1402). For example, in FIG. 7, three words. "$W_1$", "$W_2$" and "$W_3$" are registered as the non-applied word of translation word's selection in "database A". Furthermore, in FIG. 7, original sentence data "document 1" and "document 2" processed by using "database A" up to the present are registered in correspondence with "database A". When a number of the non-applied word of translation word's selection for each database is above a threshold or a ratio of the number of non-applied word of translation word's selection compared to a number of all words of the original sentences is above another threshold, the target language document database control unit 62 updates the priority degree of each target language document database in the control database memory 64 (S1403). For example, the priority degree of each database may be determined by the number of non-applied word of translation word's selections. In FIG. 7, the number of non-applied word of translation word's selections of "database A" is three, the number of non-applied word of translation word's selections of "database B" is two, the number of non-applied word of translation word's selections of "database C" is one. Assume that these three databases are only stored in the target language document database memory 9. The priority degree of database A, B, C is respectively "3, 2, 1". In this example, the smaller the value of the priority degree is, the higher the priority degree is in comparison. Alternatively, the priority degree may be determined by a fact that the number of non-applied word of translation word's selections is above a threshold, or by a ratio that the number of non-applied word of translation word's selections compared to a number of all words of the original sentence is above another threshold. Briefly, translation learning is not executed for the non-applied word of translation word's selection, and a merit to use the database to which a large number of non-applied word of translation word's selections is set is relatively low. Accordingly, the priority degree of this database lowers and the priority degree of another database raises. In this case, means for notifying the user of change of the priority degree and asking for the user's decision may be prepared. In this case, it is not necessary that the target language document database to which a large number of non-applied word of translation word's selections is set is continually used by force, and a flexible selection of database is possible by automatically changing of the priority degree. A method for changing the priority degree can be variously considered by applying the existing technique.

In an embodiment of the present invention, in addition to selection of the appropriate target language document database using the priority degree, the database used for translation word selection may be selected by a similarity degree between the original sentence data set to the database and an original language document to be translated. Concretely, when the original language document is input through the input unit 1 and supplied to the translation unit 4 by the control unit 2, translation processing of the original language document starts (S1404). In this case, the target language document database control unit 62 decides whether the original sentence data is stored in the control database memory 64 (S1405). If the original sentence data are already stored, the target language document database control unit 62 verifies the similarity degree between the stored original sentence data and input original sentences. Various methods from the prior art can be used as a verification method of the similarity degree. For example, as the verification method of the similarity degree, a document may be represented by a vector of which dimension is words included in the document, and the similarity degree is formed by this "vector space model". If the input original sentences are similar to at least one of the stored original sentence data (S1407), the target language document database control unit 62 selects the target language document database corresponding to the original sentence data decided to be similar as a database to be used for translation word learning (S1408). Briefly, the target language document database to be used is determined by a history of the translation word learning before. Automatic selection for the database suitable for the input original sentences to be translated is possible. If the original sentence data is not stored yet or if the original sentence data similar to the input original sentences does not exist in the control database memory 64, the target language document database control unit 62 selects the target language document database having the highest priority degree as a database to be used for translation word selection (S1409). In this way, the target language document database control unit 62 regards the target language document database selected at S1408 or S1409 as a database selection result by the system.

Figure 14:
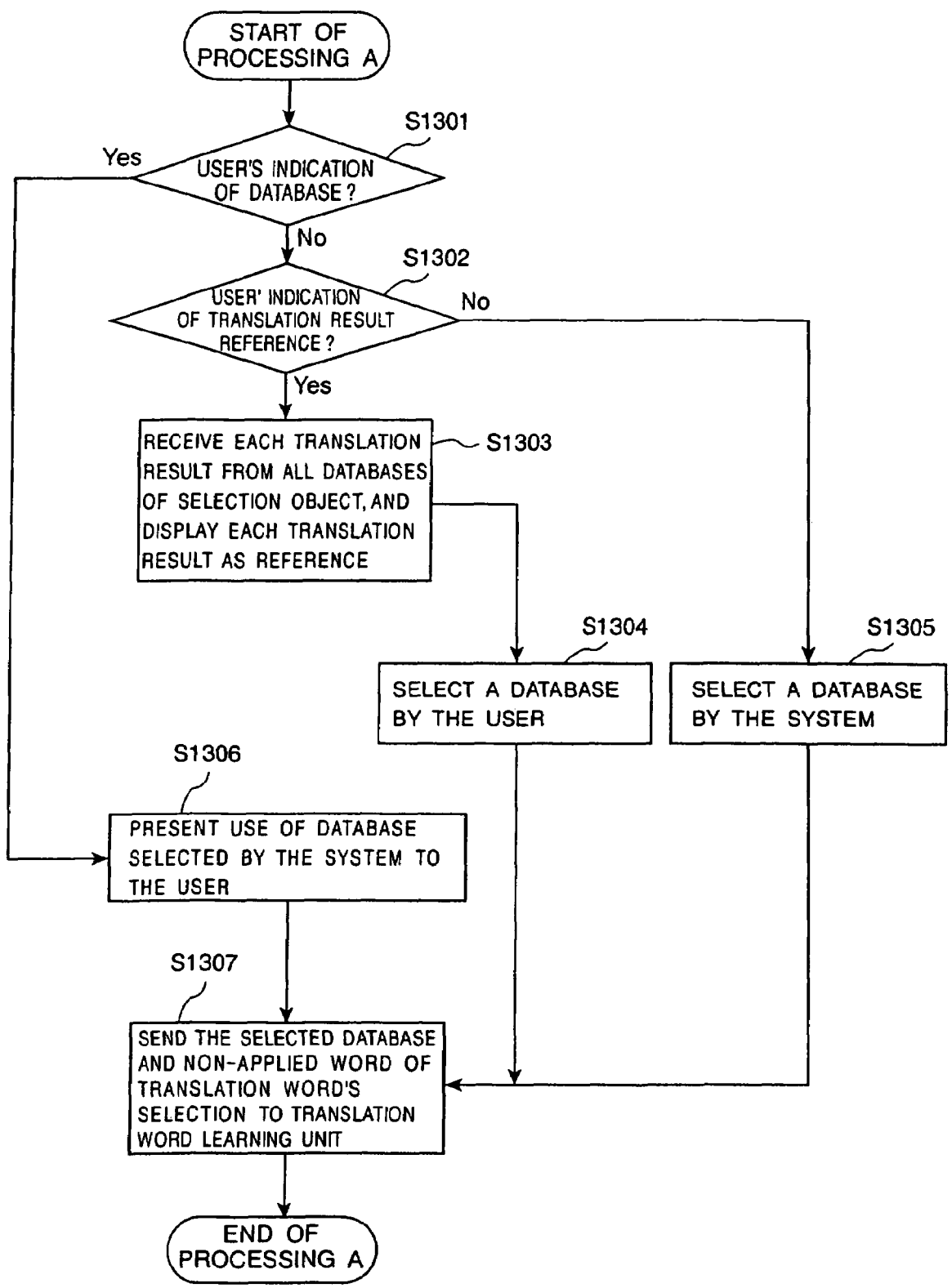
FIG. 14 is a flow chart of selection processing of the database according to an embodiment of the present invention.

Furthermore, in an embodiment of the present invention, in addition to database selection by the system, target language document database selection by the user is possible. Processing A at S1410 is database selection processing by interactive processing between the database control unit 6 and the user. FIG. 14 is a flow chart of this interactive processing according to an embodiment of the present invention. First, the database control unit 6 decides whether the user's indication of database is input (S1301). The user can indicate the target language document database to be used for translation word learning through the input unit 1. The database control unit 6 receives a database name indicated by the user (the user's indication of database) through the control unit 2. In the case of inputting the user's indication of database, the database control unit 6 preferentially selects the target language document database indicated. In this case, if the target language document database exists as a database selection result by the system, the database control unit 6 outputs the database name to the output unit 3 through the control unit 2 in order to present use of this database to the user (S1306).

It often happens that the user may not be able to effectively set the priority degree because the user does not understand the detail contents of the target language document database. Accordingly, the database control unit 6 has a function to comparatively present a translation learning result using each target language document database. Concretely, when the user indication of translation result reference is input through the input unit 1 (S1302), the control unit 2 instructs the database control unit 6 to send all database names of selection object to the translation unit 4. In response to this instruction, the database control unit 6 sends all database names of selection object and the non-applied word of translation word's selection of each database to the translation unit 4. The translation unit 4 accesses each database of received database names, and sends a translation result using each database and the non-applied word of translation word's selection to the output unit 3. The output unit 3 presents the translation result of each database to a user through a display (S1303). By comparing the translation result of each database, the user can easily determine one database to be used. The database by the user's indication is selected at S1304, and this database with the non-applied word of translation word's selection is sent to the translation word learning unit 44 of the generation unit 43 (S1307). The database selected by the system at S1408 or S1409 in FIG. 13 is selected at S1305, and this database with its non-applied word of translation word's selection is sent to the translation word learning unit 44 (S1307). If the user's indication of a translation result reference is not input, the database selected by the database control unit 6 is selected (S1305). In this way, the database selected by the priority degree and the similarity degree of the original sentence data, or the database selected by the user's indication, can be selected for translation word learning. Briefly, the target language document database suitable for the user's intention can be selected.

Figure 15:
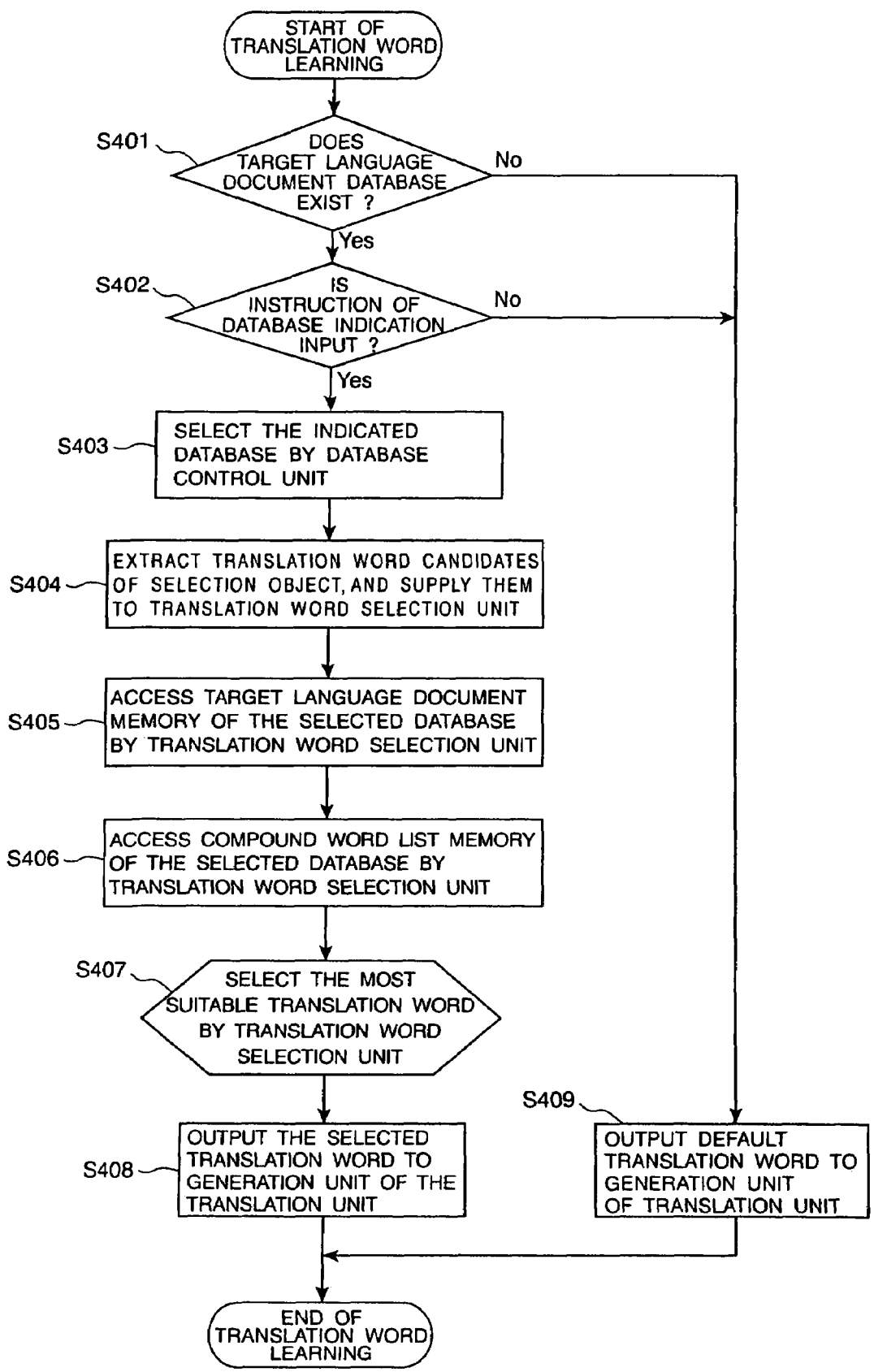
FIG. 15 is a flow chart of concrete processing of translation word learning according to an embodiment of the present invention.

When the database control unit 6 indicates the database based on the user's selection or the system's selection to the translation unit 4, the translation unit 4 executes translation word learning by using the indicated database. FIG. 15 is a flow chart of concrete processing of the translation word learning according to an embodiment of the present invention. In this example, assume that an original sentence is input through the input unit 1, this original sentence data is translated by the analysis unit 41, the conversion unit 42 and the generation unit 43 of the translation unit 4, and a plurality of translation word candidates for the same word of the input original sentence are generated. In this case, the translation word learning unit 44 determines a translation word by translation word learning. First, the control unit 2 decides whether the target language document database exists (S401). If the target language document database does not exist, the translation word learning is not executed and the generation unit 43 selects a translation word (default translation word) originally selected as a translation word candidate (S409). Next, the control unit 2 decides whether an instruction that translation word selection is not executed using the target language document database is input (S402). If this instruction is input, the translation word learning is not executed and the generation unit 43 selects a default translation word as a translation word learning (S409). If a plurality of target language document databases is stored in the target language document database memory 9, the database control unit 6 selects a suitable target language document database, and sends a name of this database with its non-applied word of translation word's selection to the translation unit 4. The non-applied word of translation word's selection (445 in FIG. 3) sent by the database is stored in the non-applied word of translation word's selection memory 444 of the translation word learning unit 44. The translation word selection unit 442 selects the target language document database (446 in FIG. 3) indicated by the database control unit 6 (S403). On the other hand, the generation unit 43 stores each translation word candidate of the original word as the object of translation word selection in the translation word candidate memory 441. The translation word candidates stored in the translation word candidate memory 441 are supplied to the translation word selection unit 442 (S404). The translation word selection unit 442 accesses the selected target language document database of the target language document memory 91, and obtains information about the target language document (S405). Furthermore, the translation word selection unit 442 accesses the compound word list memory 92 of the selected target language document database, and obtains a list of compound words included in the target language document (S406). The translation word selection unit 442 may determine a suitable translation word based on the list of compound words, "appearance frequency" and "co-occurrence intensity" included in the information about the target language document (S407).

Figure 16:
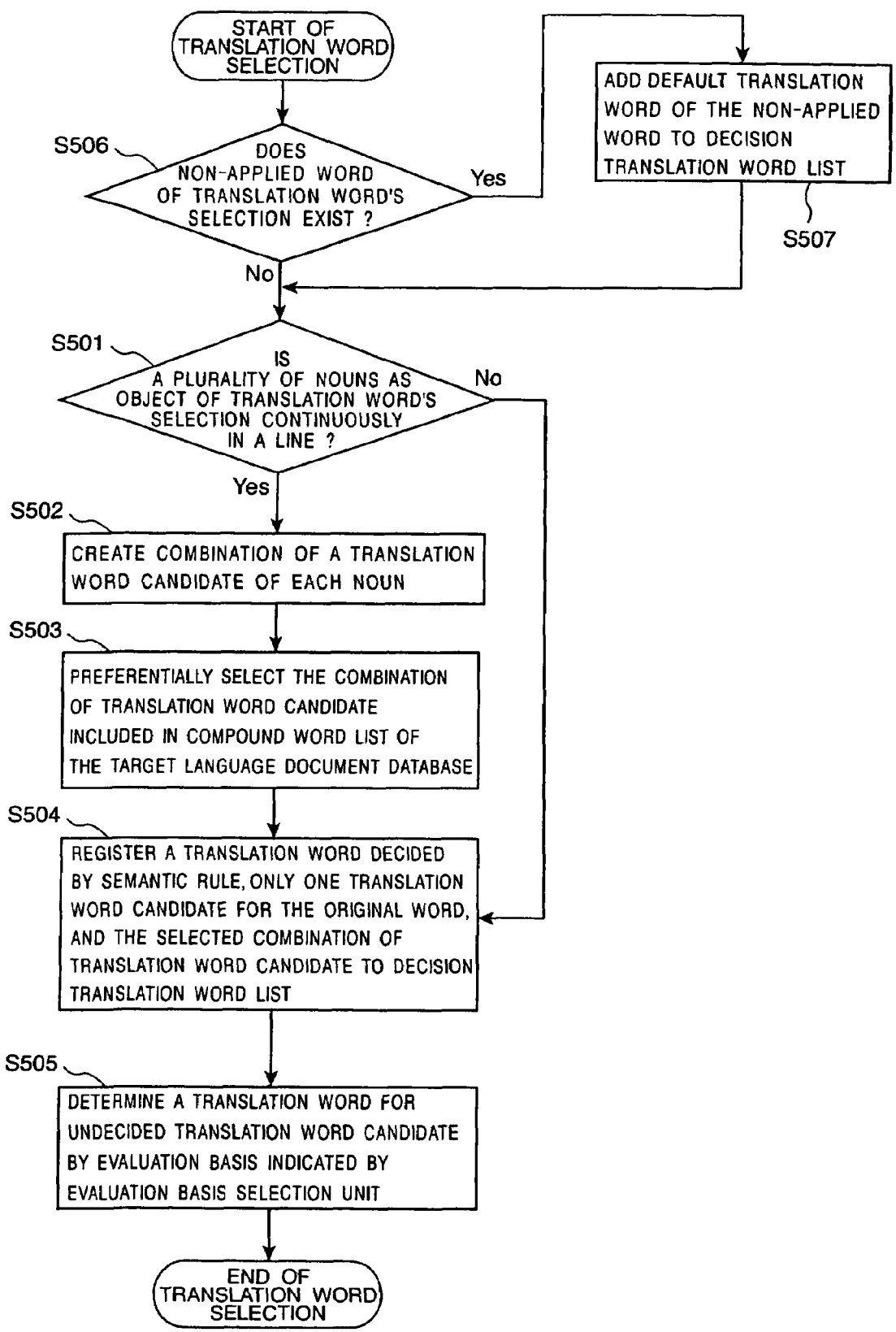
FIG. 16 is a flow chart of concrete processing of translation word's selection of step S407 in FIG. 15.

FIG. 16 is a flow chart of concrete processing of translation word selection at S407 in FIG. 15. First, the translation word selection unit 442 checks the non-applied word (original word) of translation word's selection indicated by the user (S506). If the non-applied word of translation word's selection exists, a default translation word of the original word before translation word learning is selected as the translation word of high reliability (S507). Concretely, if a translation word candidate which is the same as the default translation word for the non-applied word of translation word's selection is included in a plurality of translation word candidates, this translation word candidate is added to a decision translation word list. In the case of generating a translation sentence in the generation unit 43, if a plurality of nouns are continuously arranged and associated in the original sentence, a possibility that the plurality of nouns are a compound word is high (S501). In this case, if a plurality of translation word candidates exists for at least one noun of the plurality of nouns, each combination of translation word candidate of each noun is created (S502). One combination of translation word candidate included in the compound word list of the target language document database is preferentially selected (S503). By these processing, the number of undecided translation words is reduced and the accuracy of translation word selection improves as a whole. Furthermore, the compound word largely depends on the subject. Accordingly, by using information of the compound word, it is possible to find the translation word selection suitable for the user's liking.

For example, in the case of the translation of the English compound word "computer magazine" to a Japanese compound word, selection of which translation word from "Konpyuta magajin" or "Konpyuta Zassi" depends on the user's liking and so on. The translation word to be selected is different for each user's liking, the subject and the purpose of use. However, in the target language document database generated by the user's indication, a decision translation word is determined based on which word being used. Briefly, the target language document indicated by the user is reflected in the user's liking, the subject and the purpose of use. Furthermore, the compound word list of the target language document database is reflected on the user's liking and so on.

Accordingly, by using information of the compound word in translation word learning, translation of a higher accuracy is possible.

The translation word selection unit 442 may register a translation word decided by a semantic rule, only one translation word candidate for the original word, and the combination of translation word candidate decided by the compound word list, to a decision translation word list (S504). The reason why a translation word decided by a semantic rule is registered to the decision translation word list is because it is common that the translation word decided by the semantic rule strongly depends on that situation and its reliance is high.

Next, the translation word selection unit 442 selects a translation word from undecided translation word candidates by an evaluation basis indicated by the evaluation basis selection unit 443 (S505). When selecting a translation word, a plurality of evaluation basis in which various elements (appearance frequency, mutual information quantity and so on) may be taken into consideration. The evaluation basis selection unit 443 selects an effective evaluation basis from a plurality of evaluation basis in response to the user's indication, or may automatically determine an evaluation basis to be used for translation word selection. For example, if the evaluation basis selected by the evaluation word selection unit 443 is "priority of appearance frequency", translation word selection is executed based on the word of which appearance frequency is high in the target language document stored in the target language document memory 91. Furthermore, if the evaluation basis is "priority of co-occurrence intensity", translation word selection is executed based on two words of which the frequency of both occurring together is high in the target language document. The above-mentioned evaluation basis is one example, and another evaluation basis may be adopted. In this case, the target language document with the part of speech and information except for the compound word list can be stored in the target language document database memory 9.

In the target language document database 446 selected by the database control unit 6, the translation word selection unit 442 retrieves each translation word candidate stored in the translation word candidate memory 441, determines a translation word based on the indicated evaluation basis and the non-applied word of translation word's selection, and outputs the translation word to the generation unit 43. The generation unit 43 replaces a previous translation word (before translation word learning) in a translation result by a new translation word (after translation word learning), and sends the translation result to the control unit 2. The control unit 2 sends the translation result to the output unit 3, and a series of translation processing is completed. As to the non-applied word of translation word's selection, the translation word selection unit 442 sets a translation word (default translation word) originally generated by the generation unit 43 to the decision translation word (S507). Accordingly, the default translation word for the non-applied word of translation word's selection is not changed.

Next, at S408 in FIG. 15, the translation word learning unit 44 outputs the translation word selected by the translation word selection unit 442 to the generation unit 43 of the translation unit 4, and the translation word learning is completed. The generation unit 43 generates a translation sentence using the input translation words and outputs the translation sentence as a result of translation word learning through the output unit 3. In this way, in an embodiment of the present invention, the translation word learning is automatically executed by using the target language document database suitable for the user's intention. Accordingly, the user's operation of translation word selection is reduced and translation matched with the user's needs is possible.

Next, in FIG. 13, when the translation processing is completed (S1413), the target language document database control unit 62 stores the input original sentence data in the control database memory 64 (S1414). Then, it is decided whether a new target language document database is added to the database control unit 6. In the case of adding the new target language document database, the target language document database control unit 62 updates the contents of the control database memory 64 by resetting the priority degree of each database. In the case of indicating the non-applied word of translation word's selection again, processing from S1401 is repeated.

Figure 17:
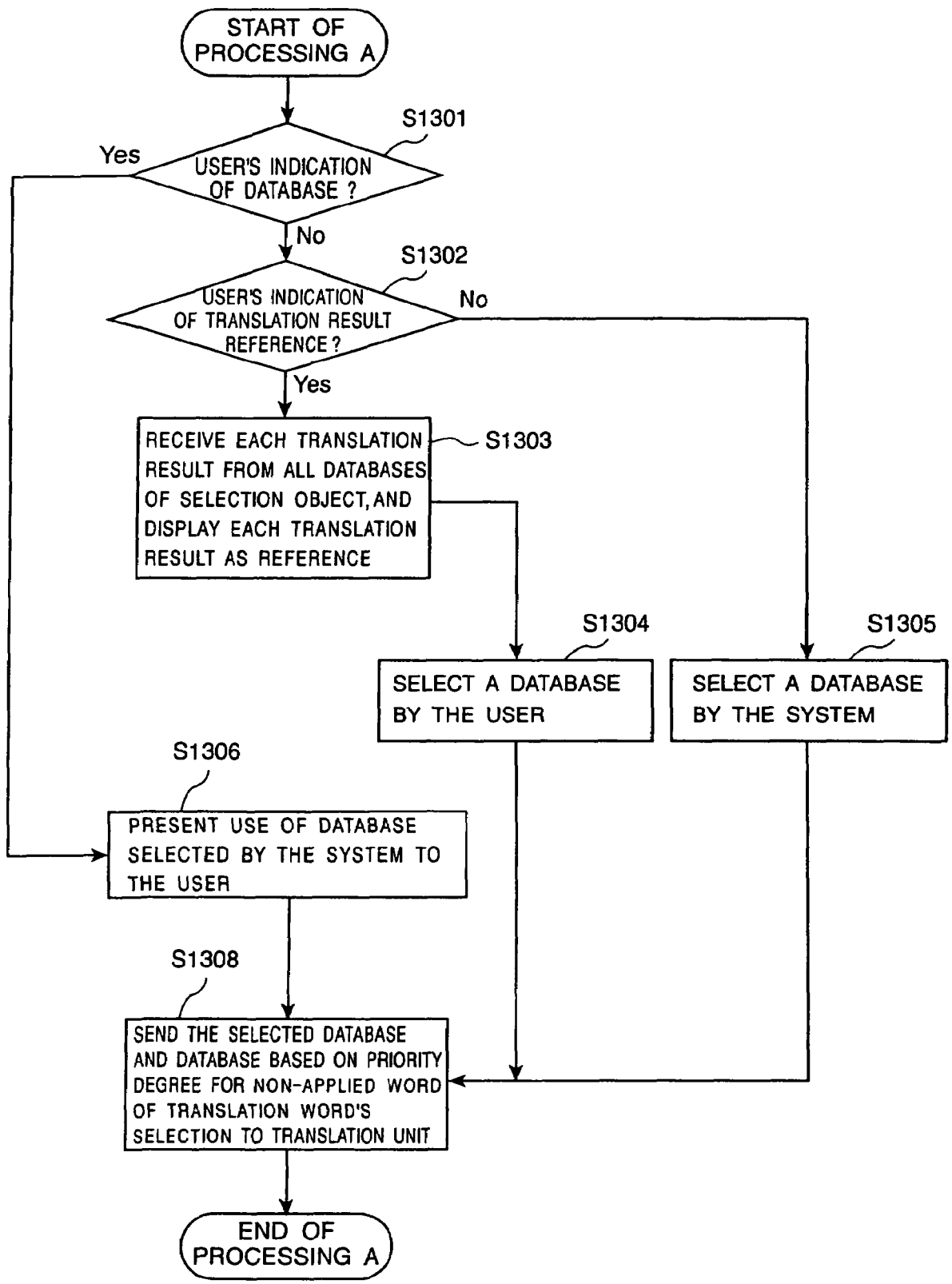
FIG. 17 is a flow chart of processing of a translation database control unit 61 according to an embodiment of the present invention.

In FIG. 14, processing of the target language document database control unit 62 is explained. Furthermore, the processing of FIG. 14 may be executed by the translation database control unit 61. In this case, flexible automatic selection of dictionary database is possible. FIG. 17 is a flow chart of one example of processing of the translation database control unit 61. In FIG. 17, at the same step as FIG. 14, the same sign is assigned in order to omit the explanation. In the flow chart of FIG. 17, step S1308 is adopted instead of step S1307 of FIG. 14. At step S1307 in FIG. 17, the non-applied word of translation word's selection is sent to the non-applied word of translation word's selection memory 444 of the translation word learning unit 44. In this case, the translation word selection unit 442 does not change a default translation word for the non-applied word of translation word's selection. On the other hand, at step 1308 in FIG. 17, in the case of translating the non-applied word of translation word's selection, the selected vocabulary database to which the non-applied word of translation word's selection is set is not used, and another vocabulary database is selectively used based on the priority degree of each database. For example, assume that the selected vocabulary database is "database a", other vocabulary databases are "database b" and "database c", the priority degree of each database is "a>b>c", and the non-applied word of translation word's selection set to "database a" is "W". In this case, the original word "W" is not translated by using the "database a" and translated by using another database of higher priority degree. In this example, the original word "W" is translated by using the "database b". If the original word "W" is also set as the non-applied word of translation word's selection of the "database b", the original word "W" is translated by using the "database c". Above-mentioned processing is repeated until decision of the translation word. If the database to be used is not found, the database of the highest priority degree is used. In this way, in addition to automatic change of the priority degree of the vocabulary database, by the translation database control unit 61, each original word can be translated by using different vocabulary database.

As mentioned-above, in an embodiment of the present invention, a plurality of target language document databases are composed from a target language document of predetermined field collected by the user. By the user's setting the non-applied word of translation word's selection to each database, the unnecessary change of a translation word based on automatic translation word learning is suppressed. The priority degree of each target language document database is automatically changed based on the situation of the non-applied word of translation word's selection and the target language document database is effectively selected by using the priority degree. Furthermore, by deciding the similarity degree between the input original sentence and the original sentence data previously processed by each database, the target language document database suitable for the input original sentence is selected and translation accuracy improves. Furthermore, by comparatively displaying the translation word learning result using each database, the user can easily select the target language document database.

By setting the priority degree based on the non-applied word of translation word's selection to each target language document database, automatic selection of translation word suitable for the user's intention can be realized.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A machine translation apparatus including a plurality of target language document databases used for a translation from an original language to a target language, each target language document database being differently composed from at least one of a plurality of target language documents, comprising:

a database control means for setting a non-applied word of translation word's selection to each target language document database, the non-applied word of translation word's selection being a word in the original language that does not require selection using the target language document database from a plurality of translation word candidates of the word, for assigning a priority degree to each of the plurality of target language document databases according to a number of the non-applied word of translation word's selection, and for indicating which of the target language document databases has the highest priority degree;

a translation word generation means for generating a plurality of translation word candidates of an original word in an original language document for the translation;

a translation word learning means for selecting a translation word as the translation from the plurality of translation word candidates by using the target language document database indicated by the database control means; and an output device for outputting the selected translation word, wherein the database control means sets the non-applied word of translation word's selection to each target language document database according to a user's indication, and the non-applied word of translation word's selection does not require the user's selection from the plurality of translation word candidates when being translated from the original language into the target language.

2. The machine translation apparatus according to claim 1, wherein if the plurality of translation word candidates are generated for the non-applied word of translation word's selection as the original word, the translation word learning means decides on one default candidate as the translation word.

3. The machine translation apparatus according to claim 1, wherein the database control means determines the higher priority degree of each of the target language document databases in order of the lower number of the non-applied word of translation word's selection associated with the target language document database.

4. The machine translation apparatus according to claim 1, wherein the database control means includes a control database memory which correspondingly stores for each of the target language document databases, a name of the target language document database, the priority degree, the non-applied word of translation word's selection, and original sentence data of which the translation word was selected by using the target language document database.

5. The machine translation apparatus according to claim 4, wherein the database control means calculates a similarity degree between an original language document to be translated and the original sentence data of each target language document database, and indicates which of the target language document databases has the highest similarity degree.

6. The machine translation apparatus according to claim 1, wherein the database control means determines the priority degree of each of the target language document databases according to the user's indication.

7. The machine translation apparatus according to claim 1, further comprising a target language document database generation means for generating at least one of the target language document databases from a target language document.

8. The machine translation apparatus according to claim 7, wherein the target language document database generation means analyzes the target language document, and extracts a compound word from the target language document based on the analysis result.

9. The machine translation apparatus according to claim 8, wherein at least one of the target language document databases includes each word of the target language document with a part of speech identifier, and a list including the compound word.

10. The machine translation apparatus according to claim 9, wherein the database control means updates the priority degree of each of the target language document databases in the control database memory according to a number of the non-applied word of translation word's selection set for the particular target language document database.

11. The machine translation apparatus according to claim 9, wherein the translation word learning means includes:
a translation word candidate memory which stores the plurality of translation word candidates of the original word;
an evaluation basis selection means for storing an evaluation basis for selecting the translation word;
a non-applied word of translation word's selection memory which stores the non-applied word of translation word's selection; and
a translation word selection means for selecting the translation word from the plurality of translation word candidates by using at least one of the target language document databases, the evaluation basis and the non-applied word of translation word's selection.

12. The machine translation apparatus according to claim 11, wherein if the original word is arranged and associated with a second original word,
the translation word selection means creates a plurality of combinations using each of the translation word candidates from the original word and from the second original word, and selects one of the combinations from the list including the compound word of the target language document database.

13. The machine translation apparatus according to claim 12, wherein if the plurality of translation word candidates from which a translation word is not selected by using the non-applied word of translation word's selection and the list of the compound word are still stored in the translation word candidate memory, the translation word selection means selects the translation word from the plurality of translation word candidates by using the evaluation basis.

14. The machine translation apparatus according to claim 13, wherein the evaluation basis is one of a priority of appearance frequency of each of the words in the target language document and a priority of co-occurrence intensity of at least two of the words in the target language document.

15. The machine translation apparatus according to claim 5, wherein the database control means presents the priority degree of each of the target language document databases in response to a user's indication for one of the target language document databases.

16. The machine translation apparatus according to claim 5, wherein the database control means presents a translation result based on each of the target language document databases in response to a user's indication of a translation result reference.

17. The machine translation apparatus according to claim 1, wherein the database control means assigns a vocabulary priority degree to each of a plurality of vocabulary databases, indicates which of the vocabulary databases as having the highest vocabulary priority degree, and indicates another of the vocabulary databases as having the second highest vocabulary priority degree to translate the non-applied word of translation word's selection set to the vocabulary database.

18. A computer-implemented machine translation method for accessing a plurality of target language document databases to perform a translation from an original language to a target language, each target language document database being differently composed from at least one of a plurality of target language documents, the computer-implemented machine translation method comprising the steps performed by a computer of:
setting a non-applied word of translation word's selection to each target language document database, the non-applied word of translation word's selection being a word in the original language that does not require selection using the target language document database from a plurality of translation word candidates of the word, for assigning a priority degree to each of the plurality of target language document databases according to a number of the non-applied word of translation word's selection, and for indicating which of the target language document databases has the highest priority degree;
generating a plurality of translation word candidates of an original word in an original language document for the translation;
selecting a translation word as the translation from the plurality of translation word candidates by using the target language document database indicated by the database control means; and
outputting the selected translation word to an output device,
wherein the non-applied word of translation word's selection is to each target language document database according to a user's indication, and the non-applied word of translation word's selection does not require the user's selection from the plurality of translation word candidates when being translated from the original language into the target language.

19. A computer-readable storage medium comprising instructions for causing a processor to execute a computer-implemented machine translation method for accessing a plurality of target language document databases to perform a translation from an original language to a target language, each target language document database being differently composed from at least one of a plurality of target language documents, the computer-implemented machine translation method comprising the steps performed by a computer of:
setting a non-applied word of translation word's selection to each target language document database, the non-applied word of translation word's selection being a word in the original language that does not require selection using the target language document database from a plurality of translation word candidates of the word, for assigning a priority degree to each of the plurality of target language document databases according to a number of the non-applied word of translation word's selection, and for indicating which of the target language document databases has the highest priority degree;

generating a plurality of translation word candidates of an original word in an original language document for the translation;

selecting a translation word as the translation from the plurality of translation word candidates by using the target language document database indicated by the database control means; and outputting the selected translation word to an output device, wherein the non-applied word of translation word's selection is to each target language document database according to a user's indication, and the non-applied word of translation word's selection does not require the user's selection from the plurality of translation word candidates when being translated from the original language into the target language.

* * * * *